United States Patent [19]

Homm

[11] Patent Number: 5,332,269
[45] Date of Patent: Jul. 26, 1994

[54] CONNECTING DEVICE FOR PLASTIC TUBES AND METHOD FOR CONNECTING A PLASTIC TUBE

[75] Inventor: Karl G. Homm, Marl, Fed. Rep. of Germany

[73] Assignee: Hewing GmbH, Fed. Rep. of Germany

[21] Appl. No.: 843,022

[22] Filed: Feb. 28, 1992

[30] Foreign Application Priority Data

Feb. 28, 1991 [DE] Fed. Rep. of Germany ....... 4106378

[51] Int. Cl.$^5$ ............................................. F16L 35/00
[52] U.S. Cl. ........................................ 285/39; 285/93; 285/249; 285/256; 29/508; 29/237
[58] Field of Search ................ 285/245, 246, 247, 248, 285/249, 250, 242, 256, 39; 29/508, 237

[56] References Cited

U.S. PATENT DOCUMENTS

| 184,639 | 11/1876 | Loring | 285/246 |
|---|---|---|---|
| 1,428,949 | 9/1922 | Eastman | 285/249 |
| 3,032,358 | 5/1962 | Rolston | 285/247 |
| 4,192,532 | 3/1980 | Pacella | 285/248 |

FOREIGN PATENT DOCUMENTS

| 941244 | 4/1956 | Fed. Rep. of Germany | 285/248 |
|---|---|---|---|
| 602993 | 4/1926 | France | 285/246 |

Primary Examiner—Dave W. Arola
Attorney, Agent, or Firm—Diller, Ramik & Wight

[57] ABSTRACT

The connecting device comprises a connecting body (12) and at least one connecting piece (20) adapted for having plugged thereon the end portion (24) of the plastic tube (14) to be connected. The outer diameter of the connecting piece (20) is slightly larger than the inner diameter of the plastic tube (14). Prior to plugging the plastic tube (14) onto the connecting piece (20), a pressing sleeve (28) is shifted onto the plastic tube (14). The inner diameter of the pressing sleeve (28) is selected such that the pressing sleeve (28) can be pressed onto the end portion (24) of the plastic tube (14) plugged on the connecting piece (20). During this process, the plastic tube (14) is displaced in axial direction until its forward end is received in a receiving groove (46) annularly surrounding the connecting piece (20) and being open towards the plastic tube (14). The receiving groove (46) is inclined with respect to the axis (50) of the connecting body (12), with the annular diameter of the receiving groove (46) decreasing with increasing depth.

27 Claims, 3 Drawing Sheets

CONNECTING DEVICE FOR PLASTIC TUBES AND METHOD FOR CONNECTING A PLASTIC TUBE

BACKGROUND OF THE INVENTION

The invention is directed to a connecting device for plastic tubes, particularly for multi-layered compound tubes and tubes of cross-linked or not cross-linked plastic material with or without an oxygen diffusion barrier layer according to the preamble of claim 1 and a method for connecting such a plastic tube to a connecting body.

Previously, for connecting or joining plastic tubes to or at connecting bodies, there have been used connecting devices known from the technology for connecting and joining metal tubes. In these known plastic tube connecting devices, the connecting body, being e.g. a connector for connecting two or more plastic tubes, a T-shaped or angular member or a distributor means (so-called fittings) or another fixedly mounted member adapted for connection of the plastic tube, comprises a connecting piece adapted for plugging attachment of the end portion of the plastic tube to be connected. To this purpose, it may be required to widen the end portion of the plastic tube prior to plugging attachment.

However, there are also known connecting devices wherein the outer diameter of the connecting piece is smaller than the inner diameter of the plastic tube. The peripheral surface of the connecting pieces is profiled in a specific manner, particularly by being provided with saw-tooth-shaped peripheral ribs. By means of a union nut having an inner cone to be screwed with the connecting body, the end portion of the plastic tube plugged onto the connecting piece is pressed against the connecting piece, with the peripheral ribs becoming "hooked" to the plastic tube. Other connecting devices are provided with a slit ring having an inner profile which is upset during tightening of the union nut and in this manner presses the plastic tube against the peripheral surface of the connecting piece. A disadvantage of known connecting devices for plastic tubes resides in that the profiles of the connecting piece and the slit ring can damage the plastic tube. This can lead either to leakages in the plastic tube or, in multi-layered compound tubes, to damage of the plastic coating, the result being that the core of the metal tube is not protected against corrosion anymore. Tightening of the union nut causes an increase of the contact pressure by which the plastic tube is pressed against the connecting piece or the slit ring is pressed against the plastic tube. Starting with a specific contact pressure, the plastic tube will be rotated together with the union nut, leading to twisting of the plastic tube on the one hand and causing the profile to "cut" into the plastic tube on the other hand. Further, after all, it is merely the profile in the region of the free end of the connecting piece that provides for the attachment of the plastic tube to the connecting body during tensile stresses. This protection against detachment of the plastic tube from the connecting device might not be sufficient in case of relatively high tensile stresses. Also, due to the profiles of the connecting piece or the slit ring, shearing forces will occur in this kind of "anchoring" of the plastic tube when the plastic tube is subjected to tensile forces.

In a two-part clamping connector known from DE 38 36 124 A1, a pressing sleeve is provided to be pressed onto the connecting end of a tube previously slipped on a connecting piece while being widened. The tube is secured to the connecting piece by continuous peripheral projections of the connecting piece between which the material of the plastic tube is pressed when the pressing sleeve is pushed onto the tube. That peripheral projection which is most remote from the free end of the connecting piece is higher than the other projections so that the securing of the plastic tube is accomplished particularly in this region. Since the plugged plastic tube is moved merely to a comparatively small extent over the highest projection, there is a danger of damages to the plastic tube due to shearing forces when the tube is subjected to axial tension.

SUMMARY OF THE INVENTION

It is the object of the invention to provide a connecting device for plastic tubes and a method for connecting plastic tubes to a connecting body wherein damages of the plastic tubes are prevented.

For solving the above object, the invention provides a connecting device for plastic tubes comprising a connecting body with a connecting piece adapted for plugging thereon the end portion of the plastic tube to be connected, wherein the outer diameter of the connecting piece is larger than the inner diameter of the plastic tube; the connecting body has formed therein an annular receiving groove, surrounding the connecting piece and being open towards the free end of the connecting piece, for receiving the (frontal) end of the plastic tube, the annular diameter of the receiving groove decreasing with increasing depth of the groove; and a pressing sleeve is provided, having its inner diameter selected such that the pressing sleeve can be shifted onto the end portion of the plastic tube plugged on the connecting piece, namely by advancing the plastic tube in the initial phase of the shifting process until the (frontal) end of the plastic tube is received in the receiving groove.

A characteristic feature of the connecting device of the invention is to be seen in the cylindrical pressing sleeve forming a press-fit connection with the end portion of the plastic tube plugged on the connecting piece and being axially pressed onto the end portion of the plastic tube without being twisted relative to the connecting piece and the plastic tube. In this regard, the pressing sleeve, preferably having a smooth inner face, does not cause any damage of the end portion of the plastic tube. Further, it is decisive for the teaching of the invention that the shifting of the pressing sleeve onto the end portion of the plastic tube first causes an axial advance movement of the plastic tube whereby the front end of the plastic tube end portion is shifted or pressed into the receiving groove. The diameter of the annular receiving groove surrounding the connecting piece and being open towards the free end of the connecting piece becomes smaller with increasing depth of the receiving groove. Thus, the receiving groove extends at an acute angle of preferably up to 30° and particularly in the range from 10° to 20°, to the axis of the connecting piece. The inclination of the receiving groove to the axis of the connecting piece depends particularly on the thickness of the plastic or multi-layered compound tube and on their materials; the thicker the tube, the larger the inclination. Therefore, when the front end of the tube is introduced, it is compressed, the resultant anchoring of the plastic tube to the connecting body being such that the plastic tube is kept attached to the connecting body while being protected against tensile stresses. When the plastic tube is subjected to tensile stresses, the compressed end of the plastic tube presses with its inner surface against the inner peripheral surface of the receiving groove and holds the end portion of the plastic tube attached to the connecting piece or body. Advantageously, the connecting piece has provided thereon a peripheral groove or peripheral indentation arranged before the receiving groove and acting like a barb when the plastic tube undergoes tensile stresses.

Preferably, the width of the receiving groove is selected such that the wall of the end of the plastic tube is received in the receiving groove without any clearance. In other words, the width of the receiving groove is substantially identical with the wall thickness of the end of the plastic tube or, however, the end of the plastic tube inserted into the receiving groove fills the whole receiving groove due to compression or a similar deformation.

The process of slipping the pressing sleeve onto the end portion of the plastic tube is performed in two phases. In the first phase of the slip-on process, the plastic tube is advanced until the frontal end is received in the receiving groove, substantially abuts the bottom of the receiving groove and fills the receiving groove. During this displacement process, the end of the plastic tube in the receiving groove need not be shifted over (radial) projections or the like; such projections would lead to shearing and thus to damage of the inner or outer surfaces of the end portion of the plastic tube received by the receiving groove. This is disadvantageous particularly in multi-layered compound tubes since the outer or inner layers of plastic material would be damaged when slipping the tube over the projection, resulting in the metal core of the tube becoming exposed. With the continuing slipping movement of the pressing sleeve, the second phase is initiated wherein the end portion of the plastic tube is tightly pressed onto the connecting piece without the plastic tube still moving ahead. During these two phases and also after completion of the pressing attachment, the connecting piece acts as a supporting body supporting the end of the plastic tube at the inner surface of the tube. If the connecting piece is provided with an outer profile, it is safeguarded that, during the actual pressing, no axial relative movements between the plastic tube and the connecting piece will occur anymore so that the plastic tube will not be damaged because of the profile but will connect with the connecting piece in tightly-jointed manner. The anchoring or clawing of the plastic tube with the connecting piece takes place at the frontal end of the plastic tube. This clawing attachment at the tube end resists to axial stresses so that, if the connecting piece is profiled, tensile stresses acting on the tube will not lead to shearing forces caused by the profile. The anchoring or clawing effect at the front end of the tube as provided in the connecting device of the invention also prevents damages of the plastic tube resulting from tensile stresses caused by thermal load changes. As already mentioned above, damages of the plastic material of the tube must be prevented in any case since otherwise there would be the danger of the tube becoming leaky and—in a multi-layered compound tube with a metal (aluminum) core—corrosion might occur after a damage of the plastic coating.

Advantageously, the width of the receiving groove is substantially equal to or only slightly larger or smaller than the wall thickness of the plastic tube in the region of the end portion. The end of the plastic tube end portion received in the receiving groove cannot warp during the advance movement of the pressing sleeve in the receiving groove so that axial movements of the plastic tube end portion are excluded as soon as the plastic tube is sunk into the receiving groove to the bottom thereof. Thus, the pressing attachment of the plastic tube end portion with the connecting piece is performed by radial constriction of the plastic tube end portion, without the plastic tube being axially moved relative to the connecting piece. Thereby, in turn, it is safeguarded that damages of the inner surface of the plastic tube due to the outer contour of the connecting piece are precluded to the largest extent.

Advantageously, the connecting piece is provided integrally on the connecting body. The connecting body comprises a main portion having the connecting body integrally connected thereto. Said main portion and the connecting body form one part and are produced by machining of an unworked body or the like.

The device of the invention can be provided both as a screwed and a press-fit connecting device. For the screwed connecting device, there is provided a union nut surrounding the pressing sleeve and adapted to be screwed to the connecting body. The outer thread for screw connection of the union nut on the connecting body is arranged on the main portion of the connecting body. When screwing the union nut into place, the union nut presses against the rear frontal end of the pressing sleeve facing away from the connecting body and axially advances the sleeve. Since the union nut and the pressing sleeve are two separate parts and the pressing area between them is relatively small, the pressing sleeve will not rotate along with the union nut when the latter is tightened.

If the connecting device of the invention is provided as a press-fit connecting device, the pressing sleeve is pressed—by a pressing or pliers-like tool operated manually, hydraulically or in some other manner—onto the end portion of the plastic tube plugged on the connecting piece. For securing the pressing sleeve against slipping off, it is provided in an advantageous embodiment of the press-fit connecting device of the invention that the pressing sleeve has a forward frontal end facing towards the connecting body, which is received in the receiving groove as is the case with the front end of the end portion of the plastic tube. Due to the inclination of the receiving groove relative to the connecting piece or resp. the inclination of the outer interior surface of the peripheral groove, the frontal end of the pressing sleeve is angled inwardly so that the pressing sleeve is secured to the connecting body through the end of the plastic tube received in the receiving groove. Advantageously, the forward frontal end of the pressing sleeve has a thinner wall than the rest of the pressing sleeve in order to reduce the forces required for said angular bending of the front end of the pressing sleeve. In the embodiment of the invention arranged as a press-fit connecting device, the opening of the receiving groove is advantageously widened by the outer interior surface of the receiving groove being beveled in its opening region. The thus provided open space of the receiving groove will receive the front end of the pressing sleeve with angular deformation thereof.

In an advantageous embodiment of the press-fit connecting device of the invention, it is provided that the confronting ends of the pressing sleeve and the connecting body each have a projection to be engaged by the pliers or pressing tool for pressing attachment of the pressing sleeve. Thus, by means of the pliers or pressing tool, the pressing sleeve is mounted on the end portion of the plastic tube plugged on the connecting piece, since the projection is arranged on the forward (and not on the rearward) frontal end of the pressing sleeve. Due to said mounting of the pressing sleeve, canting of the sleeve during the pressing process is prevented to the largest extent, thus preventing that non-uniform pressing forces are exerted on the plastic tube end portion or the end potion is damaged.

It is an advantage of the connecting device of the invention that, during tightening of the union nut or pressing attachment of the pressing sleeve, the pressing force of the pressing sleeve acting on the plastic tube and the connecting piece is constant, irrespective of the extent to which the union nut has been screwed to the connecting body or resp. the pressing sleeve has been pressed in place. In contrast, the plastic tube in known connecting devices is pressed ever stronger against the connecting piece with increasing screwing movement because of the inner cone of the union nut. As soon as the front end of the pressing sleeve of the connecting device of the invention abuts the connecting body, the connecting process is complete, i.e. the plastic tube is safely and tightly connected to the connecting body (through the connecting piece). If the device of the invention is provided as a press-fit connecting device, abutment of the pressing sleeve on the connecting body or resp. on the part thereof joining the connecting piece can be easily observed from outside. Also if the device of the invention is provided as a screwed connecting device, optical checking from outside is possible. A mark could be applied on the outside of the connecting body, it being required that the front edge of the union nut is flush with said mark for obtaining abutment of the pressing sleeve, surrounded by the union nut, to the connecting body in the region of the receiving groove. The outer mark can be e.g. an annular flange with hexagonal outer configuration, it being imperative to tighten the union nut far enough for its front end to abut the annular flange. The distance of the front end of the union nut to that surface which abuts the rear frontal end of the pressing sleeve when the latter is shifted in position, must be selected to be equal to the sum of the length of the pressing sleeve and the distance between the annular flange of the connecting body and the opening of the receiving groove.

In an advantageous embodiment of the invention, it is provided that the connecting body has a collar (or ring) surrounding the connecting piece and that the receiving groove is formed by the annular groove between said collar and the connecting piece and is limited by these parts. This solution offers advantages in manufacturing. Between the connecting piece and the remaining portion of the connecting body (in a screwed connecting device, this is the portion of the connecting body provided with the outer thread), there is an offset anyway since the outer diameter of the connecting piece is smaller than the outer diameter of the connecting body. The receiving groove is cut into the thus provided annular face so as to obtain a collar surrounding the connecting piece.

Advantageously, the pressing sleeve is provided, at the forward frontal end facing towards the receiving groove, with a beveled conical inner surface; its frontal rear end, facing away from the receiving groove, is preferably provided with an inner projection of small height. Due to the chamfering at the front end, the sleeve is "de-edged" so that damages of the plastic material during the shifting or pressing movement of the pressing sleeve are further excluded. The rear end of the pressing sleeve, being slightly drawn inwardly by the inner projection, presses from the outside against the plastic tube at the end of the shift-on process.

Advantageously, the receiving groove has a sealing ring arranged therein, being preferably an O-ring. This sealing ring does not have a sealing function with first priority; instead, in a multi-layered compound tube, it is provided for protecting the front face of the metal tube core against corrosion. The tightness of the connection of the plastic tube with the connecting device is effected by the large pressing force by which the pressing sleeve presses against the outer surface of the plastic tube and, via the plastic tube, presses the inner surface of the plastic tube against the outer surface of the connecting piece.

Embodiments of the invention will be explained in greater detail hereunder with reference to the Figures.

DESCRIPTION OF THE PREFERRED EMBODIMENTS

Figure 1:
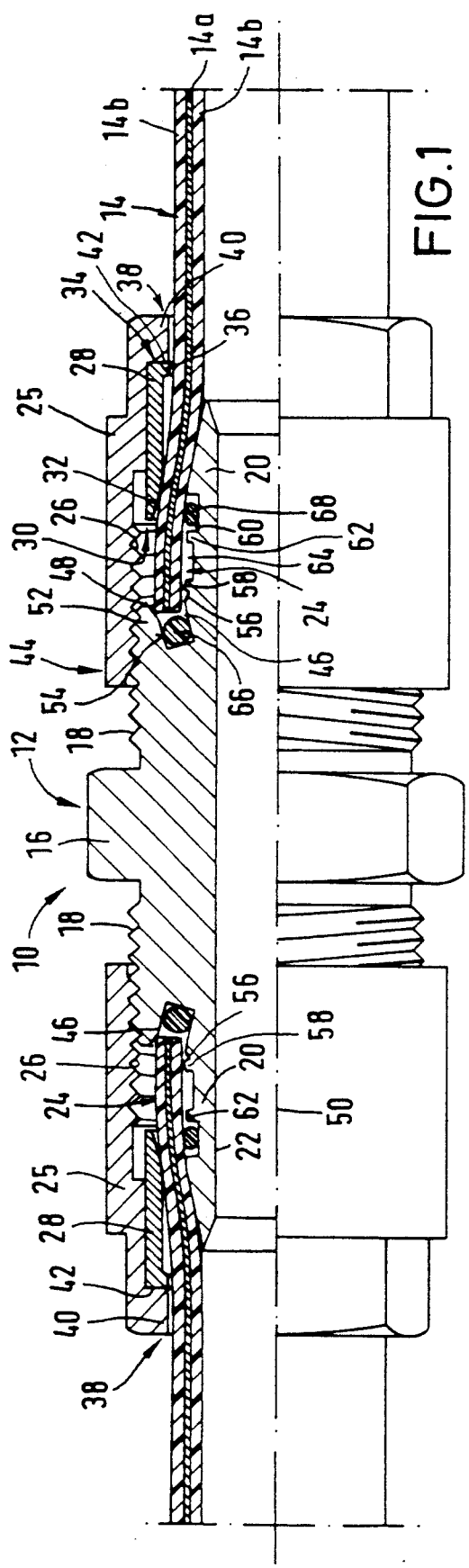
FIG. 1 is a longitudinal sectional view of a screwed connecting device (together with a plastic tube), with the union nut being partially screwed in place prior to pressing the pressing sleeve onto the device.

The following explanation of the device of the invention will refer to the embodiment provided as a screwed connecting device (FIGS. 1 and 2) and the embodiment provided as a press-fit connecting device (FIGS. 3 and 4); in the described examples, the connecting body will be a connector for connecting two plastic tubes.

The screwed connecting device 10 comprises a connecting body 12 provided as a connector for connecting the ends of two plastic tubes 14. The plastic tubes 14 are multi-layered compound tubes consisting resp. of an aluminum tube 14a having plastic layers 14b arranged on its inner and outer surfaces. Connecting body 12 comprises a substantially tubular main portion 16 having outer threads 18 on both sides thereof. In the central region of main portion 16, its peripheral surface is formed as a hexagonal outer peripheral surface. On both ends of main portion 16, there is arranged resp. a connecting piece or connection support body 20, the main portion 16 being integrally connected to the connecting piece 20, with the main portion 16 and the connecting pieces 20 forming the connecting body 12. Connecting body 12 has a through bore 22 extending therethrough.

The outer diameter of the connecting pieces 20 is larger than the inner diameter of the plastic tubes 14 to be connected. (The contour of the periphery of the connecting pieces 20 will be described in detail further below.) Depending on the respective elasticity of the plastic material, plastic tube 14 will be widened before being plugged on connecting piece 20; this will be the case particularly with a multi-layered compound tube having a metal core. Before the possibly widened end portion 24 of plastic tube 14 is plugged on a connecting piece 20, a union nut 25 with an inner thread 26 and a pressing sleeve 28 are shifted on plastic tube 14. Pressing sleeve 28 has an inner diameter which is smaller than the sum of the outer diameter of connecting piece 20 and twice the wall thickness of the end portion 24 of plastic tube 14. The frontal forward end of pressing sleeve 28 facing towards main portion 16 of connecting body 12 has a beveled inner face 32 (inner chamfering) whereas the rear end 34 of pressing sleeve 28 has an inner projection 36 of reduced thickness. The union nut 25 encloses pressing sleeve 28 and takes it up (within the nut). The rear end 38 of union nut 25 facing away from connecting body 12 is provided with an annular inner projection 40 whose annular face 42 facing towards connecting body 12 is flush with the frontal annular face at the rear end 34 of sleeve 28. The inner thread 26 of union nut 25 is arranged at the forward end 44 thereof. FIG. 1 shows the screwed connecting device 10 in the condition in which the end portions 24 of two plastic tubes 14 to be connected are plugged on the respective connecting pieces 20 and the union nuts 25 are screwed onto the connecting body 12 to such an extent that the annular faces 42 at the rear ends 34 of pressing sleeve 28 and the forward ends 30 thereof (more specifically, the inner faces 32) in the region of end portions 24 abut the outer surfaces of the plastic tubes 14.

For each connecting piece 20, a receiving groove 46 is cut into the main portion 16 of connecting body 12; receiving groove 46 annularly surrounds the appertaining connecting piece 20 and is open towards the end of connecting piece 20, i.e. towards the end of the plastic tube 14 to be connected. The receiving grooves 46 are arranged in the radial annular faces 48 provided due to the difference between the diameters of the main portion 16 in the region of the outer threads 18 thereof and of the connecting pieces 20. As seen in longitudinal section through connecting body 12, the receiving grooves 46 are inclined with respect to the longitudinal axis 50 of connecting body 12, rising at an angle of about 10° to 20° with respect to axis 50 towards the connecting pieces 20. Thus, each receiving groove 46 is formed by an annular groove between the connecting piece and an annular collar 52 on main portion 16. The inner side face of receiving groove 46 runs into the peripheral face of connecting piece 20 while the outer side face of receiving groove 46 is arranged at a distance to the inner side face and forms the inner peripheral face 54 of collar 52. This inner peripheral face 54 is beveled (chamfered) to the outside in the region of the annular opening of receiving groove 46. The width of the opening of receiving groove 46 is selected such that the distance between two diametrically opposite points on the outer edge of the receiving groove opening is equal to the outer diameter of pressing sleeve 28.

Each connecting piece 20 is provided with a first peripheral groove or peripheral indentation 56 cut into the peripheral face of connecting piece 20 and—when regarding the connecting body 12 from the free end of the respective connecting piece 20—arranged immediately before the appertaining receiving groove 46. While the receiving grooves 46 are arranged substantially in axial direction of connecting body 12, the first peripheral grooves 56 are oriented radially. That inner side face of the respective peripheral groove 56 which is closer to the receiving groove 46 is flush with the front edge of collar 52, i.e. with annular face 48. On the side facing away from receiving groove 46, the respective peripheral groove 56 is limited by a peripheral projection 58 whose peripheral face extends conically and rises towards receiving groove 46. Further, each connecting piece 20 is provided with a second peripheral groove 60 being of rectangular section and arranged nearer to the free end of connecting piece 20. On the side facing towards the first peripheral groove 56, the second peripheral groove 60 is limited by a peripheral rib 62, with a recess 64 being formed in connecting piece 20 between peripheral rib 62 and peripheral projection 58. The receiving grooves 46 and the second peripheral grooves 60 have respective O-rings 66,68 arranged therein for sealing purposes. The sealing O-ring 66 in receiving groove 46 is provided for sealing the metal core of the tube at the frontal end and protecting it against corrosion in case of a multi-layered compound tube.

The process of pressing the pressing sleeve 28 onto the plastic tube end portion 24 and connecting the plastic tube 14 to the connecting body 12 will be described hereunder starting from the screwed condition of the screwed connecting device 10 shown in FIG. 1. When the union nut 25 is screwed to the connecting body 12, the union nut 25 shifts the pressing sleeve 28 onto the end portion 24 of plastic tube 14, with the diameter of end portion 24 being widened. At the beginning of the shifting or pressing process (A press-fit connection consists between the pressing sleeve 28 and the widened plastic tube end portion 24), the pressing sleeve 28 shifts the widened end portion 24 and thus the plastic tube 14 in axial direction over the connecting piece 20 towards the main portion 16 of connecting body 12 until the forward frontal end of the plastic tube end portion 24 has entered into the receiving groove 46 and abuts the bottom thereof or the sealing ring 66 resp. Now, it is not possible anymore to further advance plastic tube 14 so that, during the further screwing motion of union nut 25, pressure sleeve 28 will be shifted over plastic tube end portion 24, pressing it from all sides against connecting piece 20. When pressing the pressing sleeve 28 onto the end portion 24, the pressing sleeve 28 is not twisted but is moved exclusively axially relative to plastic tube 14.

Figure 2:
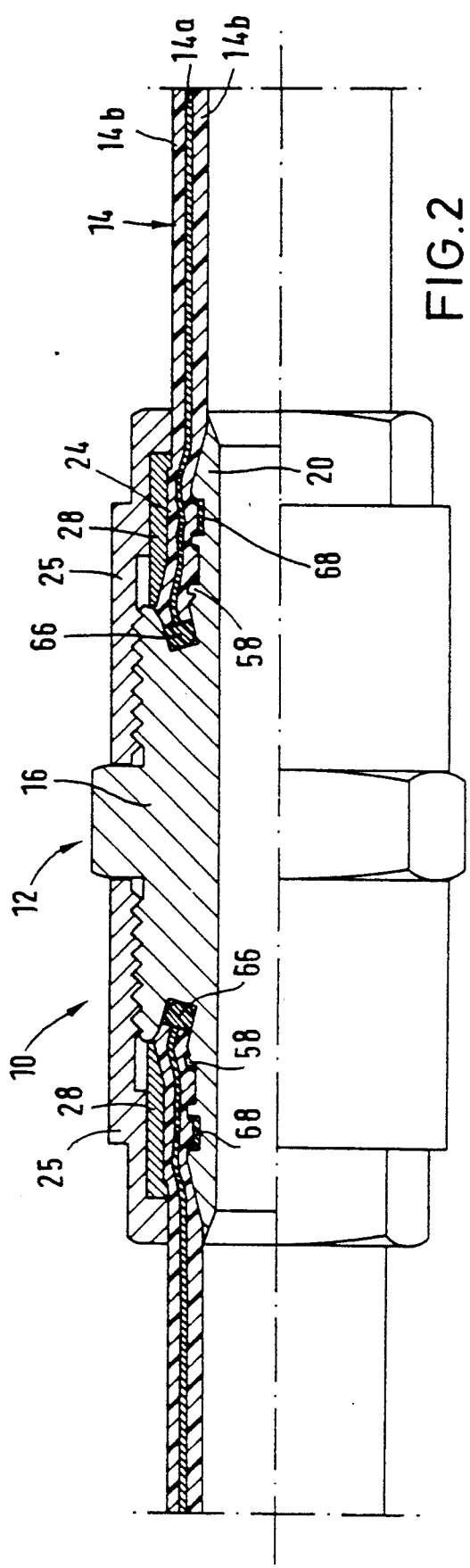
FIG. 2 is a longitudinal sectional view of the connecting device according to FIG. 1 in the screwed condition.

The pressing force by which pressing sleeve 28 radially presses against end portion 24 and urges the latter against the peripheral face of the appertaining connecting piece 20, is determined first by the material of plastic tube 14 and second by the selection of the inner diameter of pressing sleeve 28 in relation to the outer diameter of connecting piece 20 and the wall thickness of plastic tube 14. In the completely screwed condition, i.e. when the forward end 44 of union nut 25 laterally abuts the outer hexagonal contour of connecting body 12, the forward end 30 of pressing sleeve 28 contacts the peripheral edge of receiving groove opening 46 (FIG. 2). During the pressing process, the material of the inner coating 14$b$ of tube 14 is pressed into the peripheral recesses formed in connecting piece 20, i.e. partially into the second peripheral groove 60, the recess 64 and the first peripheral groove 56. During this process, also the aluminum tube 14$a$ of the outer contour of connecting piece 20 is correspondingly deformed slightly. Since the compression of the plastic tube end portion 24 is performed without the plastic tube 14 being advanced (Prior to the actual compression or pressing process, the frontal end of end portion 24 is received in receiving groove 46 so that not further axial advance movement of plastic tube 14 is possible anymore), the inner region of plastic tube 14 is not subjected to shearing by the peripheral projection 58 and the peripheral rib 62 and thus is not damaged, so that a tightly closed connection between plastic tube 14 and connecting piece 20 is obtained.

Due to the inclined shape of receiving groove 46 with respect to the longitudinal axis 50 of connecting body 12 and connecting piece 20, the frontal end of plastic tube 14, being received in receiving groove 46, is compressed. By this constriction, plastic tube 14 is secured to connecting body 12 and protected from tensile forces acting between connecting body 12 and plastic tube 14. This protection against tension is guaranteed by the face pressure between the inner face of the frontal end of plastic tube 14 and the inner side face of receiving groove 46. Particularly, in the region of peripheral rib 62 and peripheral projection 58, the plastic tube 14 is relieved from tensile forces caused by thermal load changes or mechanical stresses so that no damages due to shearing forces will occur.

Figure 3:
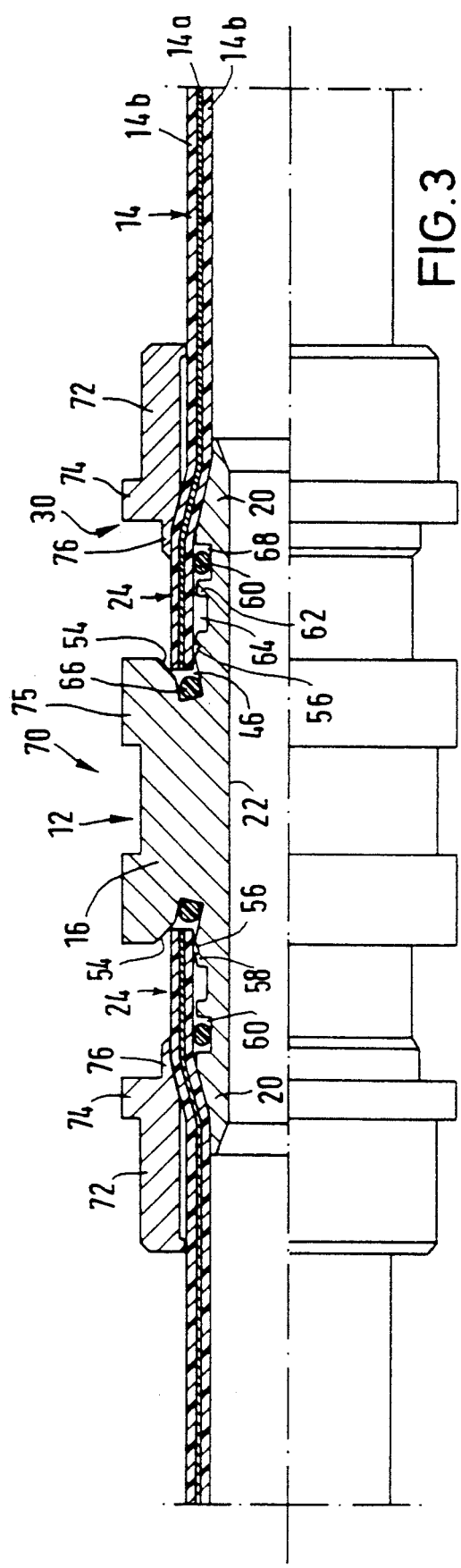
FIG. 3 is a longitudinal sectional view of a press-fit connecting device (together with a plastic tube) prior to pressing the pressing sleeve onto the device.
Figure 4:
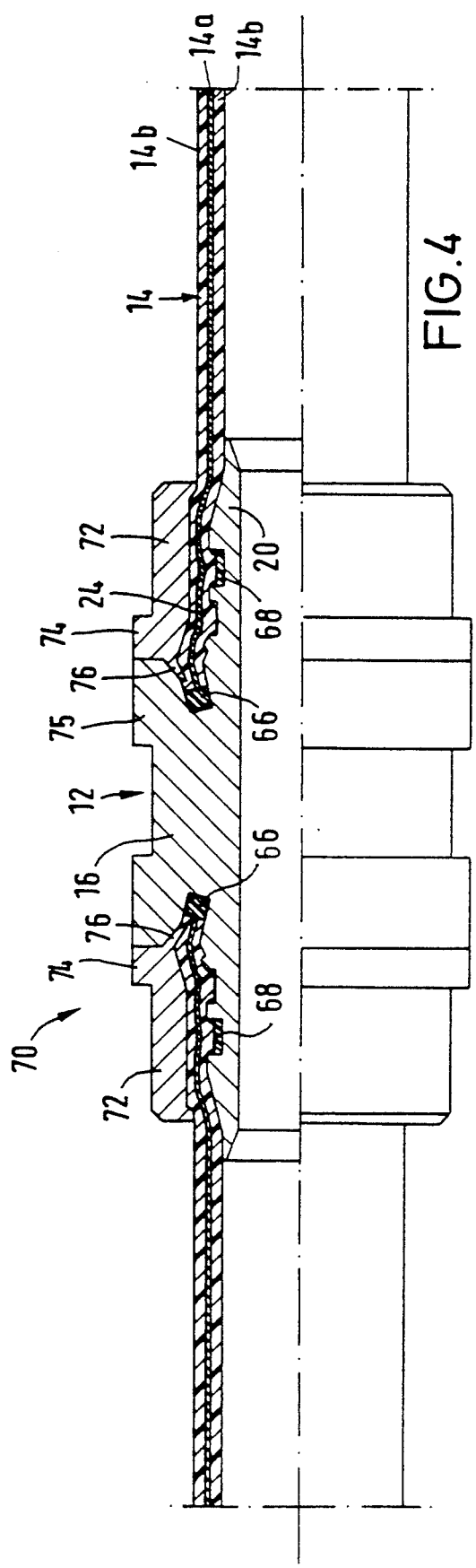
FIG. 4 shows the connecting device according to FIG. 3 with the pressing sleeve being in the completely pressed condition.
Figure 6:
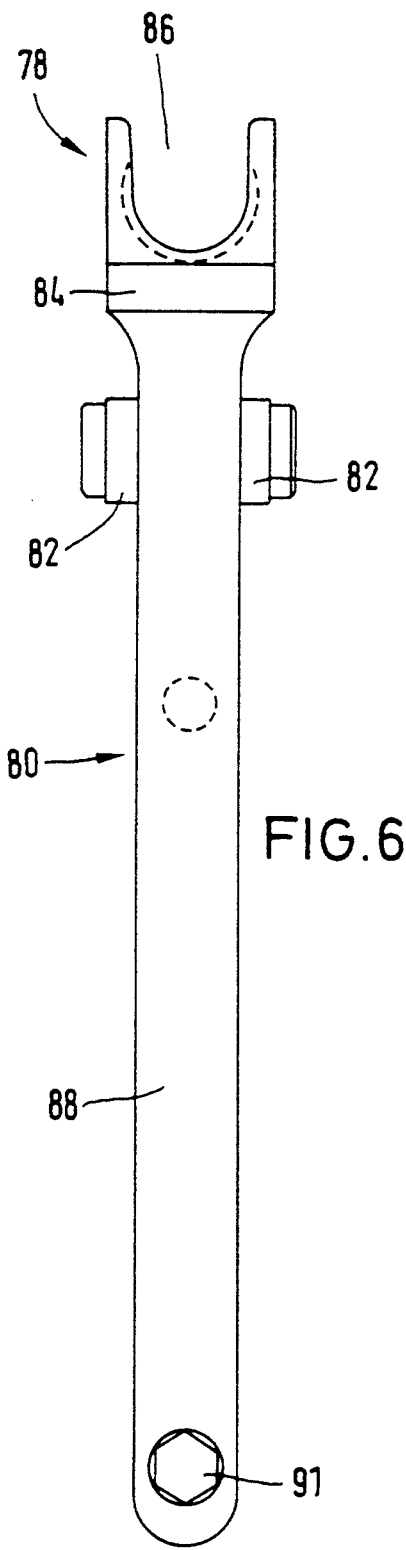
FIGS. 5 and 6 are side views of a pliers means for pressing the pressing sleeve on the connecting body of the connecting device of FIGS. 3 and 4.
Figure 5:
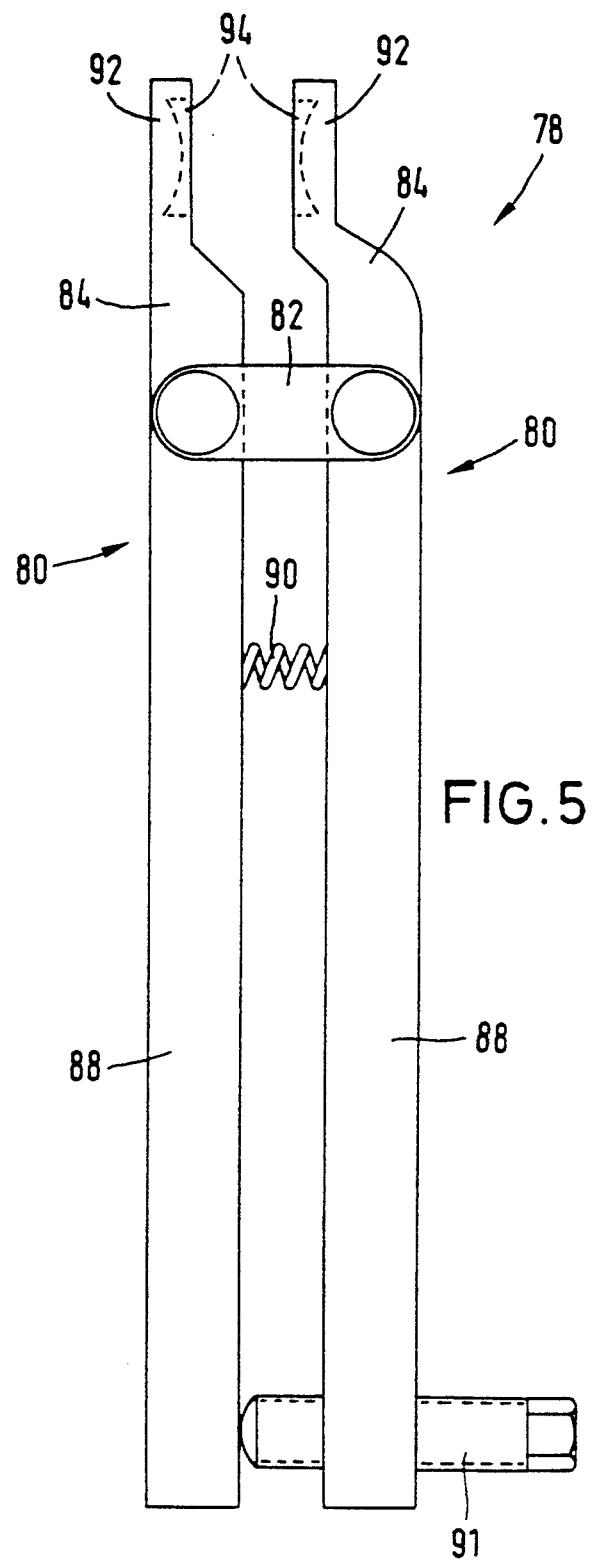

FIGS. 3 and 4 show a connecting device provided as a press-fit connecting device 70; those parts of the press-fit connecting device which correspond to parts of the screwed connecting device 10 according to FIGS. 1 and 2 are designated by identical reference numerals. As is the case in the screwed connecting device 10 of FIGS. 1 and 2, also the press-fit connecting device 70 of FIGS. 3 and 4 will by described by way of example with reference to a connecting body serving as a connector for two plastic tubes. The essential difference between the screwed connecting device and the press-fit connecting device consists in that, in the latter case, the pressing sleeve 72, by use of a suitable tool, e.g. the pliers means shown in FIGS. 5 and 6, is pressed on the plastic tube end portion 24 while the pressing sleeve 72 is moved exclusively in axial direction towards the connecting body 12. To this purpose, the pressing sleeve 72 of the press-fit connecting device 70 is longer and has a larger wall thickness than the pressing sleeve 28 of the screwed connecting device 10. For the selection of the inner diameter of pressing sleeve 72, the explanations made above in connection with the pressing sleeve 28 apply. Both the pressing sleeve 72 and the main portion 16 of connecting body 12 are provided with a peripheral projection or flange 74,76 of rectangular section. The two peripheral flanges 74,76 are arranged on the mutually confronting ends of connecting body main portion 16 and pressing sleeve 72. The peripheral flanges 74,76 are means for application of a gripping or pressing tool for pressing the pressing sleeve in place. By the fact that the peripheral flange 74 is arranged on the forward end of pressing sleeve 72 when seen in moving direction, the pressing sleeve 72 is pulled onto the plastic tube end portion 24 during the pressing so that canting of pressing sleeve 72 is excluded to the largest extent.

While the pressing sleeve 28 of the screwed connecting device 10 is secured against being pulled off the plastic tube end portion 24 by means of the union nut 25 screwed to connecting body 12, the press-fit connecting device 70 has to be provided with such a security means by modification of the pressing sleeve 72. To this purpose, the pressing sleeve 72 has its front end 30 provided with a ring 76 projecting in axial direction beyond the peripheral projection 74, the front end of ring 76 being formed with an outer bevel. Ring 76 is received in a receiving groove 46 and, when contacting the radial outer side face of receiving groove 46, is angularly bent because of the inclination of said side face. This condition, occuring when the press-fitting of pressing sleeve 72 has been completed, is shown in FIG. 4. The (anchoring) ring 76, while being angularly bent to the inside, is received in receiving groove 46 where it becomes hooked with the frontal end of plastic tube 14. The actual press-on process with the initial advancing movement of plastic tube 14 into peripheral groove 46 is similar to the process described in connection with the screwed connecting device 10. A difference between the two connecting devices resides in that the bevel of the outer side face of peripheral groove 46, i.e. of peripheral inner face 54 of collar 52, in the region of the annular collar opening is stronger in the press-fit connecting device 70 than in the screwed connecting device 10.

A pliers means 78 for pressing attachment of the pressing sleeve 72 to the connecting body 12 of press-fit connecting device 70 will be described hereunder with reference to FIGS. 5 and 6. The pliers 78 comprise two pliers arms 80 spaced from each other and being pivotably supported on two bars 82 laterally enclosing the pliers arms 80. Both of the front ends 84 of the arms 80 of the pliers are forked and comprise substantially U-shaped recesses 86. The pliers arms 80 are connected to the bars 82 in such a manner that the front ends 84 are considerably shorter than the rear ends 88. Preferably, the length of the rear ends 88 is three to four times as large as the front ends 84. A spring 80 extends between the rear ends 88 of the pliers arms 80; one of the rear ends 88 has a transverse threaded bore having a bolt 91 screwed therein, with the front end of said bolt abutting the rear end 88 of the other arm 80 of pliers 78 for moving the front ends 84 apart.

The confronting inner sides of the end portions 92 of the front ends 84 have recesses 94 formed therein along the edges of the U-shaped recesses 86. When seen from the side, the inner edges of the U-shaped recesses 86 are of circular shape. This shape of the front end portions 92 makes it possible that the pliers 78, irrespective of the opening position of the front ends 84, are permanently in linear contact with the peripheral projections 74,75 on the pressing sleeve 72 and the connecting body 12. Thereby, canting of the pressing sleeve during the pressing process is prevented.

The front ends 84 or resp. the front end portions 92 of the pliers 78 are moved towards each other by rotation of the bolt 91 being provided with a hexagonal outer face. The edge portions of the recesses 86, abutting on pressing sleeve 72 and connecting body 12 at the annular faces of the peripheral projections 74,75 facing away from each other, push or press the pressing sleeve 72 onto the plastic tube end portion 24. The recesses 86 in the forked end portions 92 allow application of the pliers even under restricted space conditions, i.e. when the free space around the press-fit connecting device is considerably limited. Due to the translation ratio of 3:1 to 4:1, the force by which the rear pliers ends 88 are moved away from each other during twisting of bolt 91, is translated into a relatively large pushing or pressing force between pressing sleeve 72 and connecting body 12. Application of this force is facilitated by the fact that the rotating of bolt 91 is effected by a wrench or a ratchet. Further, it is generally possible that the pliers 78 are operated by a machine or hydraulically instead of hand-operation.

As can be seen in FIG. 5, the end portions 92 of the front ends 84 of the pliers arms 80 are offset to such an extent that, with the pliers arms 80 arranged parallel to each other, the extension of the side face or line of that pliers arm 80 whose rear end 88 has the bolt 91 pressing thereagainst, extends at the level of the center of the distance between the confronting side faces of the front end portions 92 of the pliers 78.

I claim:

1. A connecting device for plastic tubes comprising a connecting body (12) which includes at least one connecting piece (20) having slid thereon an end portion (24) of a plastic tube (14), an outer diameter of said connecting piece (20) being larger than an inner diameter of the plastic tube (14), the connecting body (12) having formed therein an annular receiving groove (46) surrounding the connecting piece (20) and being opened in a direction toward a free end of the connecting piece (20) for receiving the end portion (24) of the plastic tube (14), the receiving groove (46) having a diameter decreasing with increasing depth of the receiving groove (46), and pressing sleeve means (28; 72) having an inner diameter selected such that the pressing sleeve means (28; 72) is axially movable relative to the connecting piece (20) for moving the end portion (24) of the plastic tube (14) axially on the connecting piece (20) until the end portion (24) of the plastic tube (14) is received in the receiving groove (46).

2. The connecting device as defined in claim 1 wherein the connecting body (12) has a collar (52) surrounding the connecting piece (20), and the receiving groove (46) being set-off between said collar (52) and the connecting piece (20).

3. The connecting device as defined in claim 2 wherein the receiving groove (46) on a radially inner side thereof is defined by an inclined outer peripheral face of the connecting piece (20) and on a radially outer side thereof is defined by an inner peripheral face (54) of a collar (52) generally parallel to the outer peripheral face of the connecting piece (20).

4. The connecting device as defined in claim 3 wherein the inner peripheral face (54) of the collar (52) is bevelled for enlarging the size of the receiving groove (46).

5. The connecting device as defined in claim 1 wherein a forward end (30) of the pressing sleeve means (28; 72) faces toward the receiving groove (46) and has a bevelled conical inner face (32).

6. The connecting device as defined in claim 1 wherein a rearward end (34) of the pressing sleeve means (28; 72) faces away from the receiving groove (46) and has an inner projection (36).

7. The connecting device as defined in claim 1 wherein the receiving groove (46) extends at an angle of up to 30° to an axis (50) of the connecting piece (20).

8. The connecting device as defined in claim 1 wherein the receiving groove (46) has a sealing ring (66) arranged therein.

9. The connecting device as defined in claim 1 wherein the inner diameter of the pressing sleeve means (28; 72) is smaller than the sum of an outer diameter of the connecting piece (20) and twice the wall thickness of the tube end portion (24).

10. The connecting device as defined in claim 1 wherein the connecting piece (20) is provided with a peripheral groove (56) located between a free end of the connecting piece (20) and said receiving groove (46).

11. The connecting device as defined in claim 10 wherein a radially inner side face of the peripheral groove (56) which is adjacent to the receiving groove (46) is flush with a front edge of a collar (52) surrounding the connecting piece (20).

12. The connecting device as defined in claim 10 including a peripheral projection (58) having a conical peripheral face, and said peripheral projection (58) being located between said peripheral groove (56) and the free end of said connecting piece (20).

13. The connecting device as defined in claim 10 wherein the connecting piece (20) has a further peripheral groove (60) with a sealing ring (68) arranged therein.

14. The connecting device as defined in claim 13 wherein said further peripheral groove (60) is of a rectangular cross-section and the sealing ring is an O-ring.

15. The connecting device as defined in claim 13 wherein said further peripheral groove (60) on a side thereof facing toward the receiving groove (46) is limited by a peripheral rib (62).

16. The connecting device as defined in claim 13 wherein a peripheral recess (64) is arranged between the two peripheral grooves (56, 60).

17. The connecting device as defined in claim 1 including a nut (25) threaded upon the connecting body (12) and said pressing sleeve means (28) being shiftable along the end portion (24) of the plastic tube (14) upon the threading of said nut (25).

18. The connecting device as defined in claim 17 wherein said nut (25) bears against a rear end (34) of the pressing sleeve means (28) facing away from the receiving groove (46).

19. The connecting device as defined in claim 1 wherein the pressing sleeve means (72) can be shifted by means of a pressing tool (78) onto the end portion (24) of the plastic tube (14).

20. The connecting device as defined in claim 1 wherein the pressing sleeve means (72) can be shifted by means of a plier-type tool (78) onto the end portion (24) of the plastic tube (14).

21. The connecting device as defined in claim 20 wherein a forward end (76) of said pressing sleeve means (72) is received in the receiving groove (46) and is bent radially inwardly.

22. The connecting device as defined in claim 20 wherein said pressing sleeve means (72) and the connecting body (12) are provided with means for applying a tool (78) for sliding the pressing sleeve means (72) along the end portion (24) of the plastic tube (14).

23. The connecting device as defined in claim 22 wherein said application means are peripheral projections (74, 75).

24. A connecting method of connecting a plastic tube (14) to a connecting piece (20) of a connecting body (12) comprising the steps of positioning an end portion (24) of the plastic tube (14) in generally external telescopic relationship to the connecting piece (20) and internal telescopic relationship to a sleeve (28; 72), sliding the sleeve (28; 72) toward the end portion (24) of the tube (14) urging said end portion of said tube further upon the connecting piece (20) while compressing the tube portion (24) against the connecting piece (20) and (b) further sliding the sleeve (28; 72) to effect the attachment of the tube end portion (24) to the connecting piece (20) and thereafter securing the sleeve (28; 72) to the connecting body (12) wherein said connecting body (12) includes an annular receiving groove (46) into which a terminal end of the tube end portion (24) is inserted upon said further movement of said sleeve (28; 72).

25. The method as defined in claim 24 wherein the movement of the sleeve (28; 72) is effected until an end (30) of the sleeve (28; 72) abuts the connecting body (12).

26. The method as defined in claim 24 wherein the sleeve (28) is secured to the connecting body (12) by a nut (25) threaded upon the connecting body (12).

27. The method as defined in claim 24 wherein the sleeve (72) is moved by a tool (78) which applies a relative force between the connecting body (12) and the sleeve (28; 72) to effect sleeve movement.

* * * * *